P. H. HERBERT.
EYEGLASSES.
APPLICATION FILED FEB. 17, 1911.
1,036,843.
Patented Aug. 27, 1912.
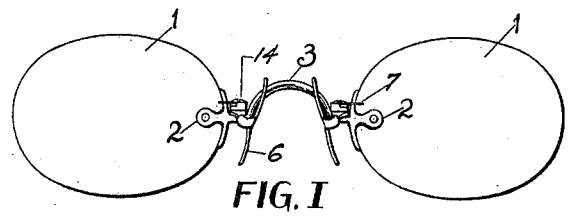
FIG. I
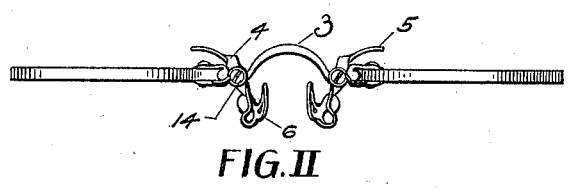
FIG. II
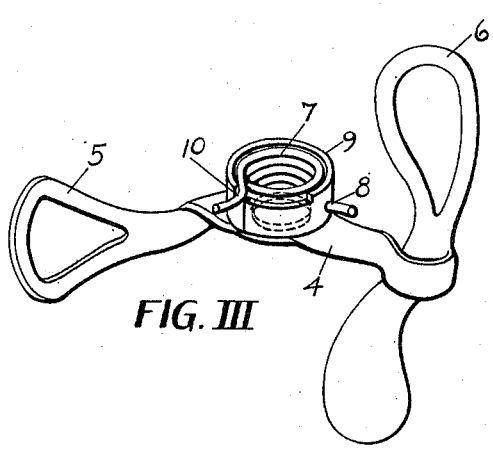
FIG. III
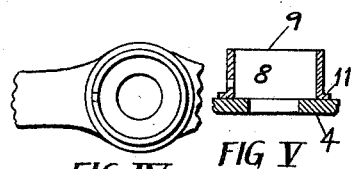
FIG. IV
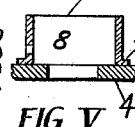
FIG. V
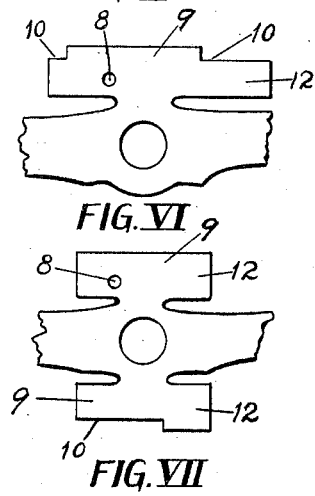
FIG. VI
FIG. VII
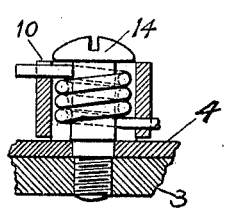
FIG. VIII
WITNESSES:
Joseph J. Demers
Frank R. MacNiven
INVENTOR
PITT H. HERBERT
BY Harry H. Styll
ATTORNEY

UNITED STATES PATENT OFFICE.

PITT H. HERBERT, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,036,843.  Specification of Letters Patent.  Patented Aug. 27, 1912.

Application filed February 17, 1911. Serial No. 609,114.

*To all whom it may concern:*

Be it known that I, PITT H. HERBERT, a citizen of the United States, residing at Southbridge, in the county of Worcester and State of Massachusetts, have invented certain new and useful Improvements in Eyeglasses, of which the following is a specification.

My invention relates to certain improvements in eyeglasses and more particularly to that form of eyeglass in which there are employed spring actuated nose clamps or guards pivoted adjacent the opposite ends of the bridge.
The principal object of my invention is to provide means for holding the spring in place when the nose clamps are removed from their pivots.

Another object of my invention is to provide means whereby the actuating spring may be hidden from view when the eyeglasses are in place on the wearer's face.

Another object of my invention is to provide a blank for a nose guard having leaves which may be bent up and shaped into a receptacle for the actuating spring.

With these and other objects in view, the invention consists in the novel construction and arrangement of parts hereinafter described, delineated in the drawings and specifically claimed, it being understood that changes properly falling within the scope of what is claimed may be made without departing from the spirit of my invention.
Similar numerals of reference are employed to denote corresponding parts throughout the several figures of the drawings.

In the accompanying drawings: Figure I is a rear elevation of an eyeglass embodying my invention. Fig. II is a top or plan view of Fig. I. Fig. III is a perspective of a nose clamp lever showing the spring and spring receptacle. Figs. IV and V show a plan view and sectional elevation of one type of spring receptacle on the nose clamp lever. Figs. VI and VII show two types of nose clamp blanks having leaves adapted to be shaped up into a receptacle for the spring.
Fig. VIII is a transverse section through the nose clamp lever and spring receptacle and shows the pivot post and actuating spring in place.

Referring to the drawings: A pair of lenses 1 are connected by means of the usual clips 2 and bridge 3; nose clamp levers 4 having a handle or finger piece 5 and a nose clamp 6 are pivoted adjacent to the opposite ends of the bridge in the usual well known manner by means of a pivot post or screw
14. The nose clamp levers 4 are actuated by a spiral tension spring 7 surrounding the pivot post 14, one end of which is held in a recess 8 in the barrel 9 which surrounds the spring and pivot post. The other end of the spring is held against the lens clip 2 when the parts are in alinement for operation. In order that the nose clamp lever may be rotated in the usual manner, the upper part of the barrel 9 is recessed or slotted at 10 in way of the end of the spring which bears against the clip 2.

For clearness of illustration, the end of the spring which is held in the recess 8 in the walls of the barrel 9 is shown extending beyond the barrel as it would be when first put in place. This end, however, may be clipped off flush with the sides of the barrel so as to present a neat and uniform appearance.

In Figs. IV and V, I have shown a form of barrel on the guard which is made separate from the guard and is provided with flanges 11 which may be soldered or otherwise secured to the nose clamp levers 4, the center of the barrel coinciding with the center of the opening in the nose clamp for the pivot post.

Figs. VI and VII indicate a portion of a blank out of which the nose clamp lever is stamped or cut. On the side of the nose clamp lever adjacent to the opening therein for the pivot post, leaves 12 are provided. These leaves may be made on one side only as shown in Fig. VI or they may be made on both sides as shown in Fig. VII. At the same time the leaves are stamped out the recesses 8 and 10 for the spring ends may also be cut if desired. The leaves 12 are adapted to be bent up and around so that they may be formed into the barrel 9 surrounding the opening in the nose clamp lever for the pivot post.

The parts are assembled as follows: The lenses are attached to the clips 2 and bridge 3 in the usual manner. The spring 7 is placed in the barrel 9 on the nose clamp lever 4, one end bearing in the recess 8 and the other end held against a shoulder of the recess 10, as shown in Fig. III. The nose clamp lever containing the spring is next placed on the bridge with the opening therein for the pivot post in alinement with the opening in the bridge end adapted to receive the pivot post and the pivot post inserted and secured in place allowing the lever an easy bearing action on the pivot post. The end of the spring which is held in the recess 10 of the barrel is then pressed in place behind the strap of the lens clip 2, thereby creating a tension on the spring and tending to actuate the nose clamps toward each other.

To place the eyeglasses on the nose the finger piece ends 5 of the nose clamp levers 4 are drawn toward each other contracting the spring 7 within the barrel 9, thereby spreading apart the nose clamps 6 to their full width. The eyeglass is then inserted in place on the nose and the finger pieces 5 released, whereupon the actuating spring 7 tending to relieve itself, will expand and drive the nose clamps 6 toward each other and into supporting engagement with the flesh at the side of the nose.

To remove the eyeglasses the operation is the reverse of that described for placing them in place. The finger pieces are drawn toward each other, contracting the spring 7, whereupon the clamps 6 are released and the eyeglasses may be withdrawn from the face and out of engagement with the nose.

It will be seen that by the use of my invention the nose clamp lever may be removed for repairs and replaced without disturbing the actuating spring 7. This feature of the spring remaining in the barrel is very desirable, as it provides means for holding the spring when the pivot post is being inserted, which has hitherto been a very tedious operation, and also allows the nose clamps to be supplied by the manufacturer to the trade as separate parts with the spring in place thereon, it only being necessary when replacing a worn out or broken nose clamp lever to place the new guard in place and insert the pivot screw in the bridge end. It will also be noted that by providing a barrel on the guard for holding the spring that the spring is hidden from view when the eyeglasses are in place and a neat and finished appearance presented to the eye.

Having now described my invention, what I claim as new and desire to secure by Letters Patent is:

A blank for a nose clamp for eyeglasses comprising a lever, a pivot hole and an extending member adapted to be bent up and shaped into a wall surrounding the pivot hole.

In testimony whereof I affix my signature in presence of two witnesses.

PITT H. HERBERT.

Witnesses:
 RALPH E. THOMPSON,
 ROBT. S. CALLENDER.

---

Copies of this patent may be obtained for five cents each, by addressing the "Commissioner of Patents, Washington, D. C."